United States Patent [19]
Alimpich et al.

[11] Patent Number: 6,115,044
[45] Date of Patent: Sep. 5, 2000

[54] DATA PROCESSOR CONTROLLED DISPLAY WITH A TREE OF ITEMS WITH MODIFICATION OF CHILD ITEM PROPERTIES DESIGNATED AT PARENT LEVEL WITHOUT MODIFICATION OF PARENT ITEM PROPERTIES

[75] Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of Colo.

[73] Assignee: International Business Machines Corporation, Armonk, N.Y.

[21] Appl. No.: 09/053,211

[22] Filed: Mar. 31, 1998

[51] Int. Cl.[7] ........................................................ G06F 13/00
[52] U.S. Cl. ............................ 345/356; 345/965; 345/961
[58] Field of Search ..................................... 345/356, 352, 345/353, 359; 395/839, 114, 115, 116, 112

[56] References Cited

U.S. PATENT DOCUMENTS

| | | | |
|---|---|---|---|
| 5,412,776 | 5/1995 | Bloomfield et al. | 345/356 |
| 5,467,434 | 11/1995 | Hower, Jr. et al. | 395/114 |
| 5,742,778 | 4/1998 | Hao et al. | 395/332 |
| 5,838,319 | 11/1998 | Guzak et al. | 345/340 |
| 5,844,553 | 12/1998 | Hao et al. | 345/329 |
| 5,917,492 | 6/1999 | Bereiter et al. | 345/357 |

Primary Examiner—Raymond J. Bayerl
Assistant Examiner—David E. Brown
Attorney, Agent, or Firm—Robert B. Martin; Felsman, Bradley, Vaden, Gunter & Dillon, LLP

[57] ABSTRACT

A data processing controlled display system for the interactive display and control of operations through a displayed tree having a plurality of items to be acted upon, wherein a parent item at one level has at least one child item at the next lower level, and means for enabling a modification of at least one property of all of the child items by enabling a designation of the modification of the property at the parent level without the modification of any property of the parent item. The system also has means for enabling the modification of the properties of at least one of the child items independently of any designation of modification made at the parent level.

13 Claims, 13 Drawing Sheets

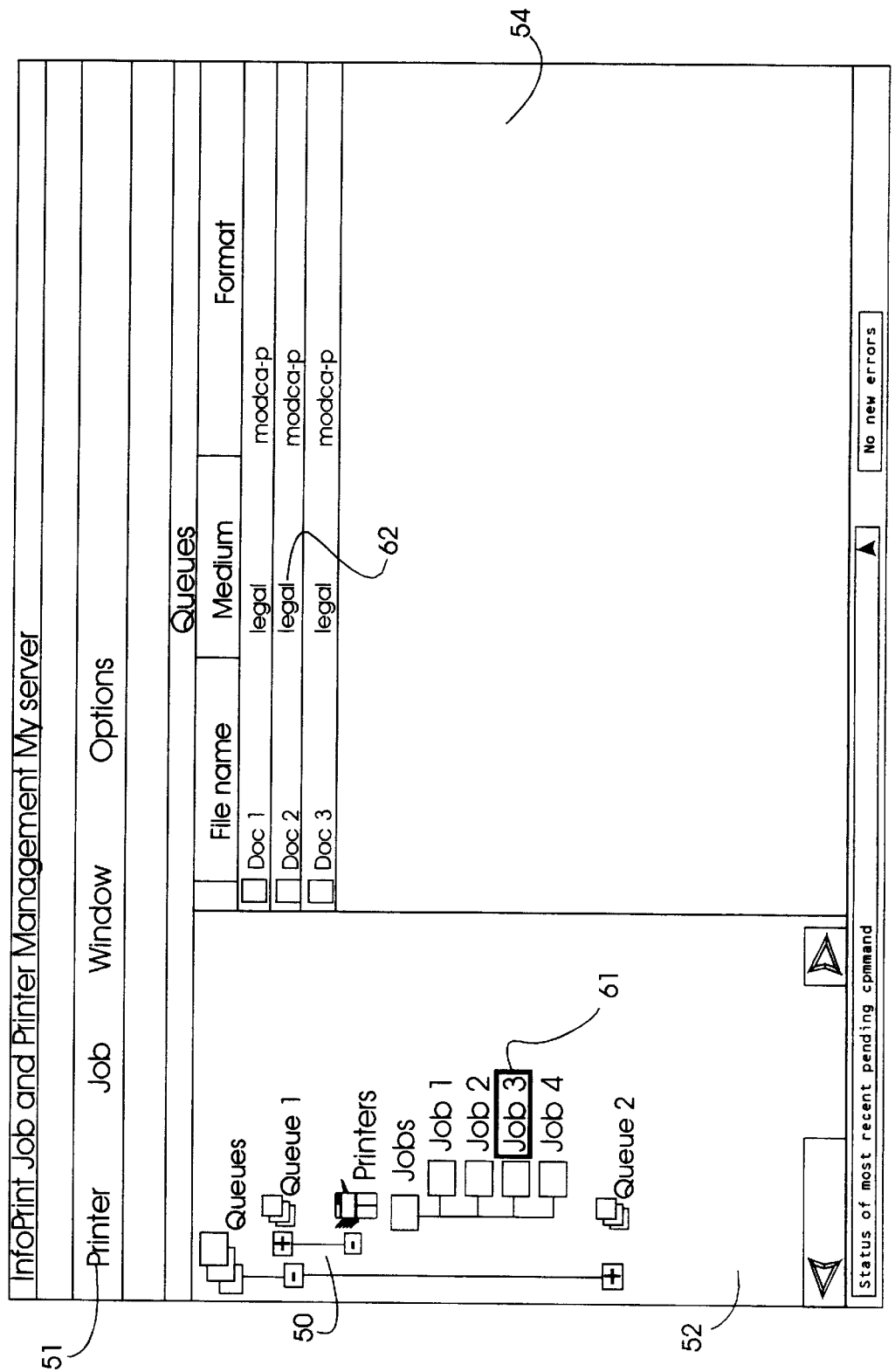

DATA PROCESSOR CONTROLLED DISPLAY WITH A TREE OF ITEMS WITH MODIFICATION OF CHILD ITEM PROPERTIES DESIGNATED AT PARENT LEVEL WITHOUT MODIFICATION OF PARENT ITEM PROPERTIES

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", Attorney Docket No. AM9-97-153 U.S. patent application Ser. No. 09/053,210; "Data Processor Controlled Display System With a Plurality of Switchable Customized Basic Function Interfaces for the Control of Varying Types of Operations", Attorney Docket No. AM9-97-155 U.S. patent application Ser. No. 09/053,214; "Data Processor Controlled Display System for the Control of Operations With Control Properties Which are Selectably Constant or Variable", Attorney Docket No. AM9-97-156 U.S. patent application Ser. No. 09/053,207; "Data Processor Controlled Display Interface With Tree Hierarchy of Elements View Expandable into Multiple Detailed Views", Attorney Docket No. AM9-97-157 U.S. patent application Ser. No. 09/053,209; "Data Processor Controlled Interface with Multiple Tree of Elements Views Expandable into Individual Detail Views", Attorney Docket No. AM9-97-158 U.S. patent application Ser. No. 09/052,858; and "Data Processor Controlled Display System With a Tree Hierarchy of Elements View Having Virtual Nodes", Attorney Docket No. AM9-97-160 U.S. patent application Ser. No. 09/053,213; all are assigned to International Business Machines Corporation by Claudia Alimpich et al. and all are filed concurrently herewith.

TECHNICAL FIELD

The present invention relates to interactive computer controlled display systems for controlling operations and particularly to user friendly display interfaces for the control of such operations.

BACKGROUND OF THE INVENTION

The computer and computer related industries have benefitted from a rapidly increasing availability of data processing functions. Along with this benefit comes the problem of how to present the great number and variety of available functions to the interactive operator or user in display interfaces which are relatively easy to use. In recent years, the hierarchical tree has been a widely used expedient for helping the user to keep track of and organize the operative and available functions. In typical tree structures such as those in Microsoft Windows 95™ and IBM Lotus™ systems, there is presented on the display screen a variety of available functions and resources in tree hierarchies with classes and subclasses of functions and resources displayed as objects in a descending and widening order based upon some kind of derivation from the next higher class or subclass.

The relationships between items in different levels of a tree are sometimes referred to as parent/child relationships. In some structures, child items can inherit properties from their parent items. In such structures when specific properties are changed in the parent item, those changed properties will be inherited by its child items. However, there may arise circumstances where it is desirable to effect changes in all child objects of a given parent without modifying the parent and without necessarily having to modify each child. The conventional tree structures which allow inheritance would not be adequate for such purpose because the properties of the parent would have to be modified in order to pass down the modification.

SUMMARY OF THE INVENTION

The present invention provides a tree display interface which provides for the modification of child objects through their parents without modifying the parent. As a result, the parent remains unmodified in the tree structure and continues to represent its original functions and resources.

Thus, the present invention provides an ease of use tree display interface through which operators may effectively manage computer controlled operations. This is accomplished through an interactive display interface providing a tree of items. Parent items at one level have child items at the next lower level. Interactive means are provided for the modification of the properties of child items in said tree wherein the operator is enabled to designate at the parent level the modification of the properties to be made in the child items represented by said parents, but without modifying the parent.

The interface also provides for the interactive modification of the properties of individual child items in the tree independently of the designation of property modification at the parent level. The invention may effectively be used in application or operating system interface including such interfaces for production operations as well as in communications.

The tree system of the present invention may be distinguished from existing trees of elements having parent child relationships where the child elements inherit or receive attributes from the parents. In the operation of the present invention, there is no passing down of attributes from parent to child elements. Furthermore, the parent item may have entirely different properties than its children. Nevertheless, in the present invention, the parent item is still capable of representing its child items. In this manner, a modification may be made in the properties of the child items by designating the change at the representative parent item, but, unlike the above inheritance relationships, there is no change in the parent's properties.

For another embodiment, attention is directed to copending U.S. Patent Application: "Data Processor Controlled Display System With a Tree Hierarchy of Elements View Having Virtual Nodes", C. Alimpich et al., filed on the same date as the present application (Attorney Docket No. AT9-97-160) which is cross-referenced above and describes a tree with virtual elements. The virtual tree elements described in that application may be used as the parent items of the present invention through which the child items are changed without changing the parent. Since such parent items would be virtual, they would have no properties themselves which could be changed; yet the virtual parent which represents the child items could be used to effectuate a change in the properties of the child items.

BRIEF DESCRIPTION OF THE DRAWINGS

FIG. 6A is tree view of the display screen of FIG. 6 expanded to show the child items of the designated parent item of FIG. 6;

DETAILED DESCRIPTION OF THE PREFERRED EMBODIMENT

Figure 1:
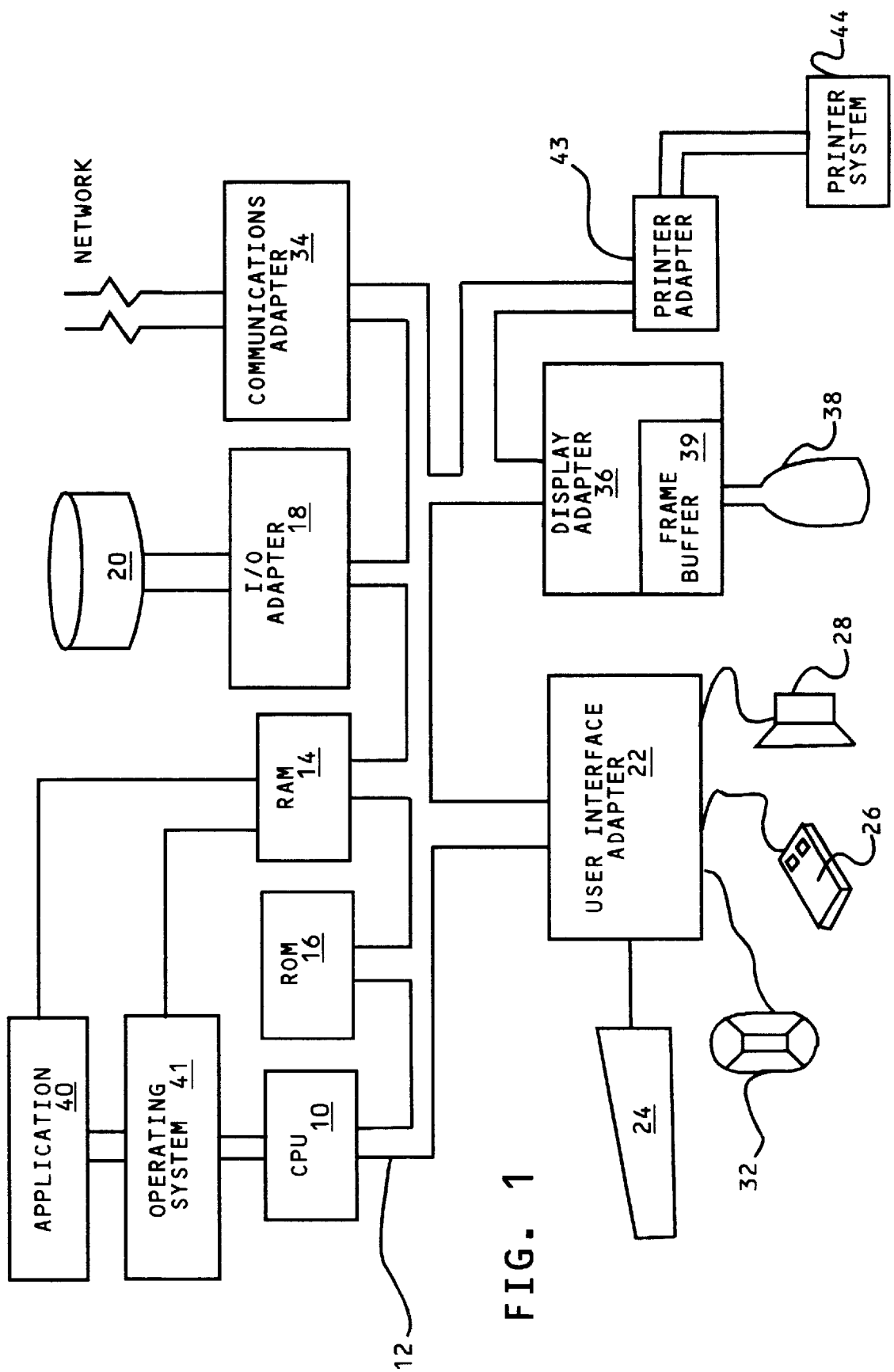
FIG. 1 is a block diagram of an interactive data processor controlled display system including a central processing unit which is capable of implementing the program of the present invention for presenting tree views of items.

Referring to FIG. 1, a typical data processing system is shown which may function as the computer controlled display terminal used in implementing the tree views of the present invention. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation); Microsoft Windows 95™ or Windows NT™, as well as Unix and AIX operating systems. A programming application for presenting tree views of action queues and modifying such queues in accordance with the present invention, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12.

It should be noted that software components including the operating system 41 and the application 40 are loaded into RAM 14 which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems, particularly when the operations controlled by the interfaces of the present invention are in a network environment or when the controlled operations are in communications systems. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the illustrative embodiment, which will be subsequently described, the tree of action queues interfaces will be shown with respect to the control of high throughput printers such as electrophotographic or laser printers. A local printer system 44 may be accessed and controlled via printer adapter 43 while, as previously mentioned, networked printers may communicate via communications adapter 34.

There will now be described a simple illustration of the present invention with respect to the display screens of FIGS. 2 through 10. When the screen images are described, it will be understood that these may be rendered by storing an image and text creation programs, such as those in any conventional window operating system in the RAM 14 of the system of FIG. 1. The operating system is diagrammatically shown in FIG. 1 as operating system 41. The display screens of FIGS. 2 through 10 are presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 2:
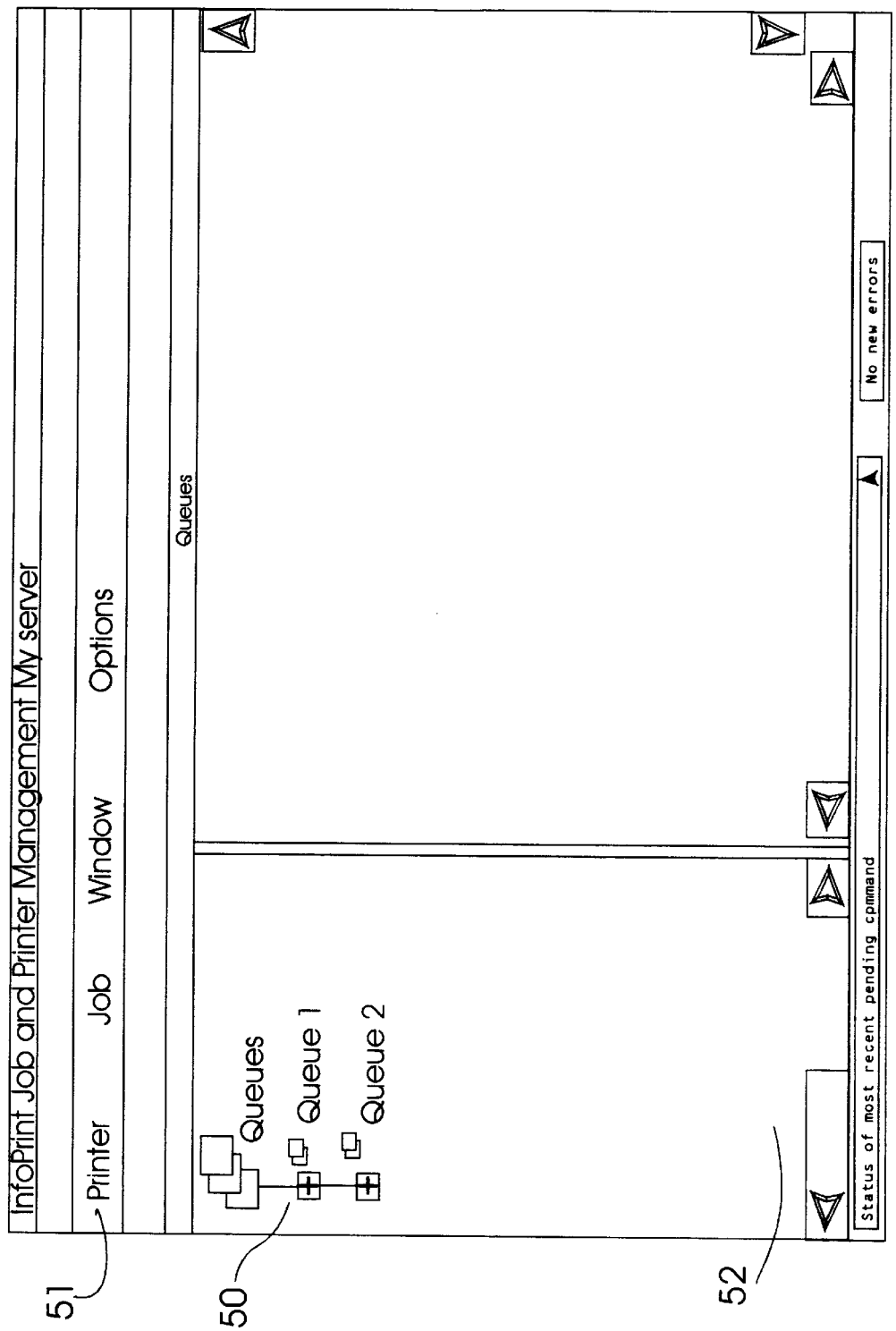
FIG. 2 is a diagrammatic view of a display screen on which an initial tree view of items is shown prior to any user selection.
Figure 3:
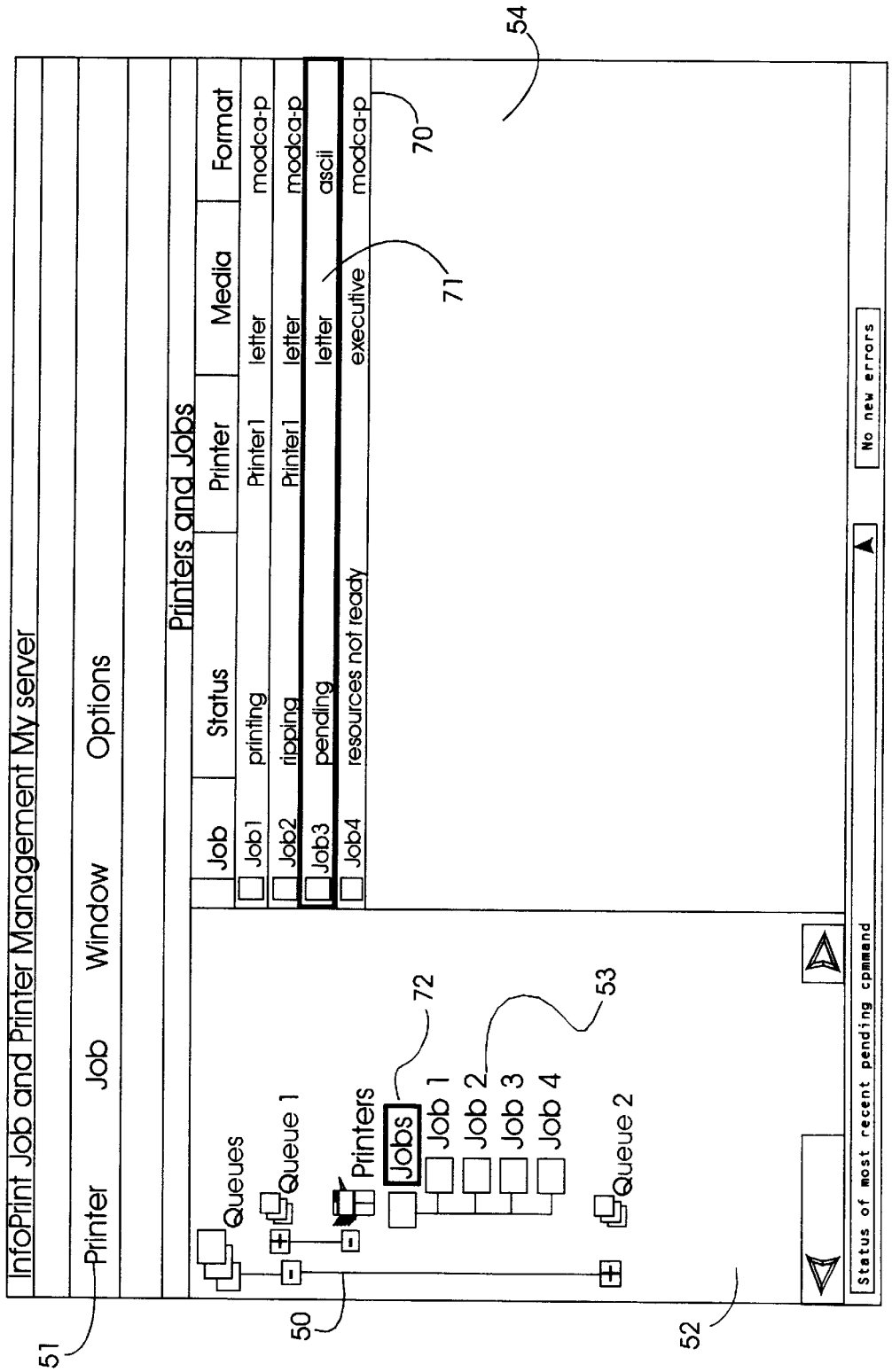
FIG. 3 is the view of the display screen of FIG. 2 showing the tree resulting from the selection of items at a couple of levels from the tree of items of FIG. 2 and the designation of a parent item for modification of its child items.
Figure 4:
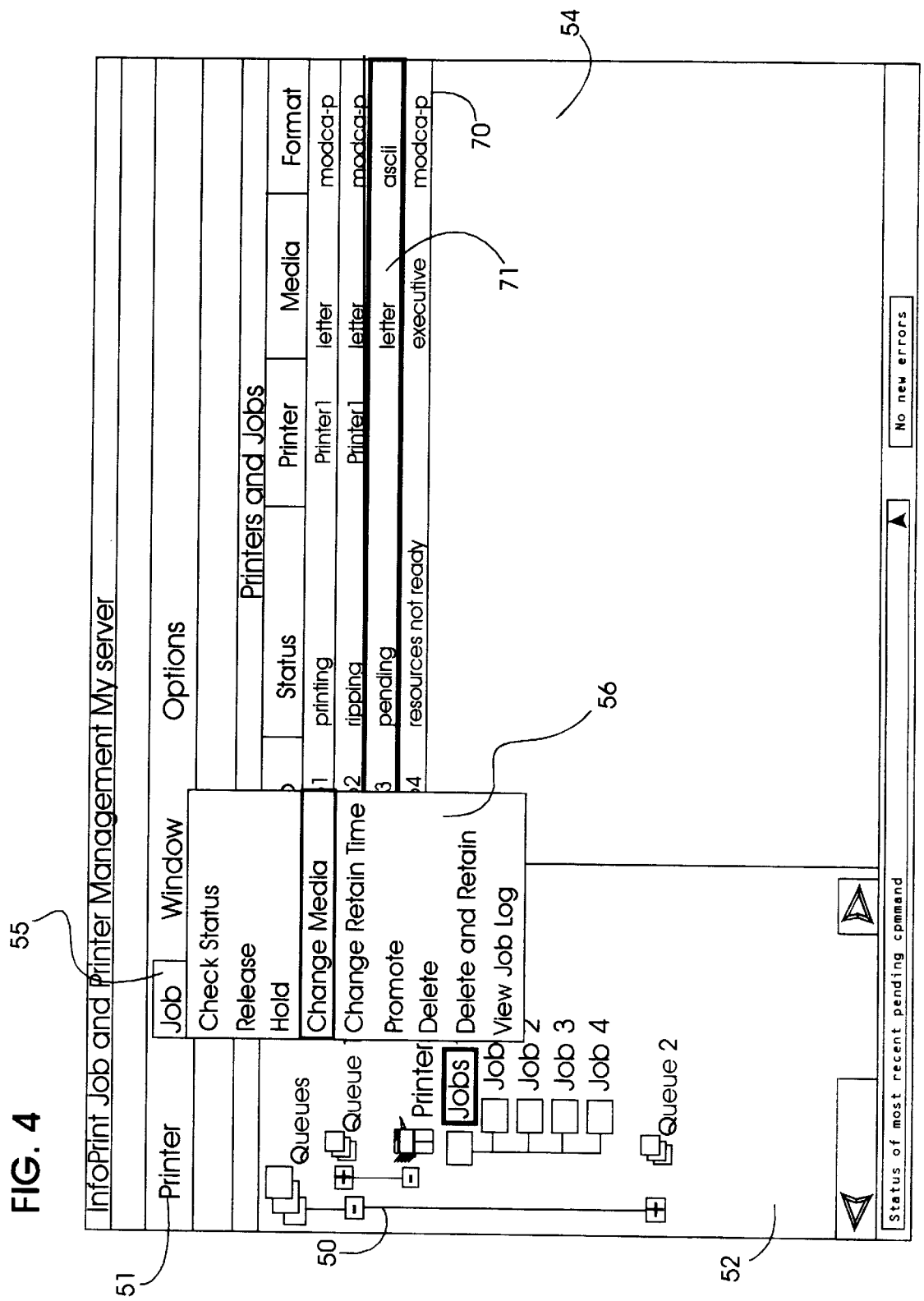
FIG. 4 is the view of the display screen of FIG. 3 during the modification of all of the child items of a selected parent item.
Figure 5:
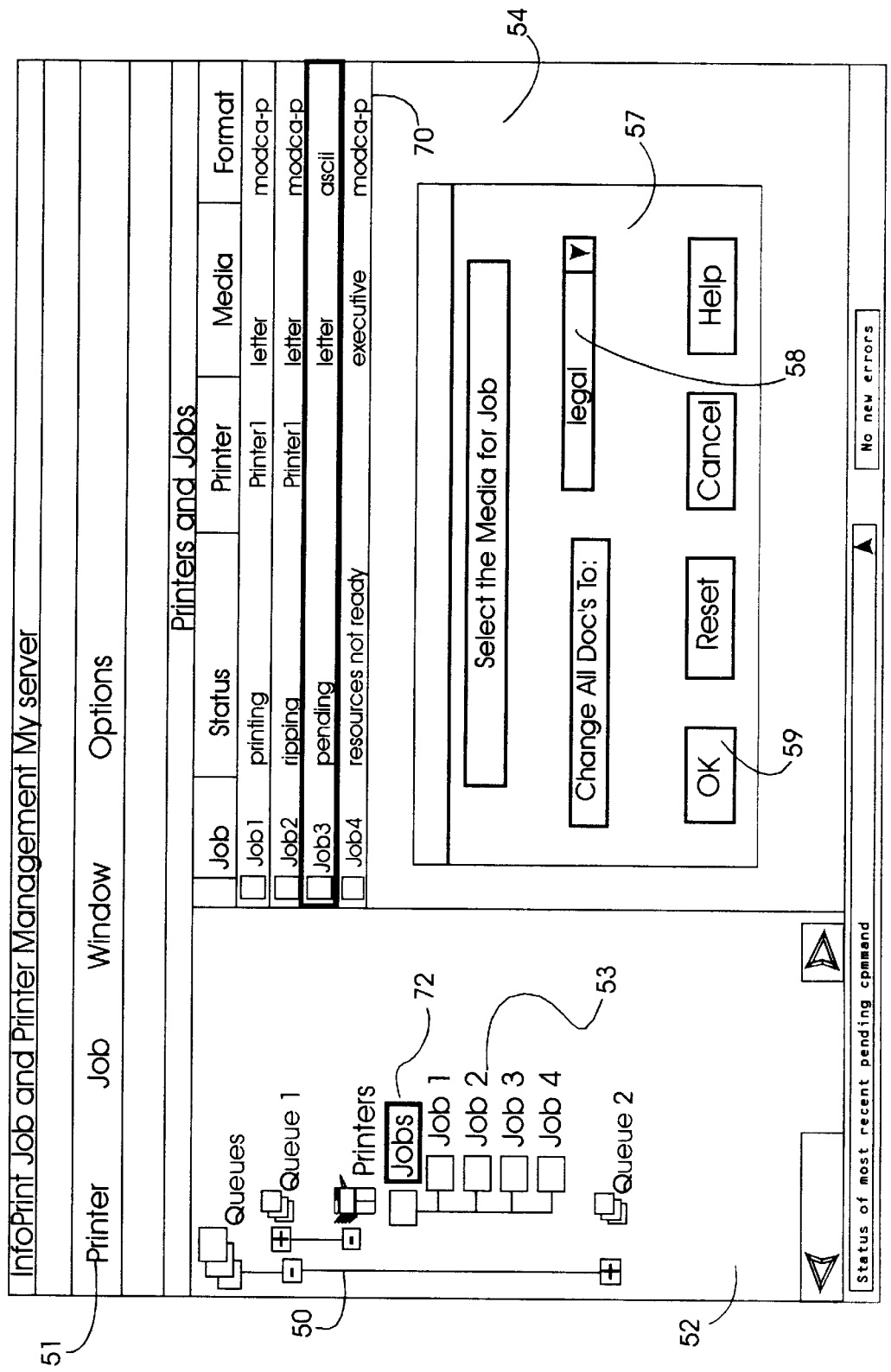
FIG. 5 is the view of the display screen of FIG. 3 during the next step of modification after the step of FIG. 4.
Figure 6:
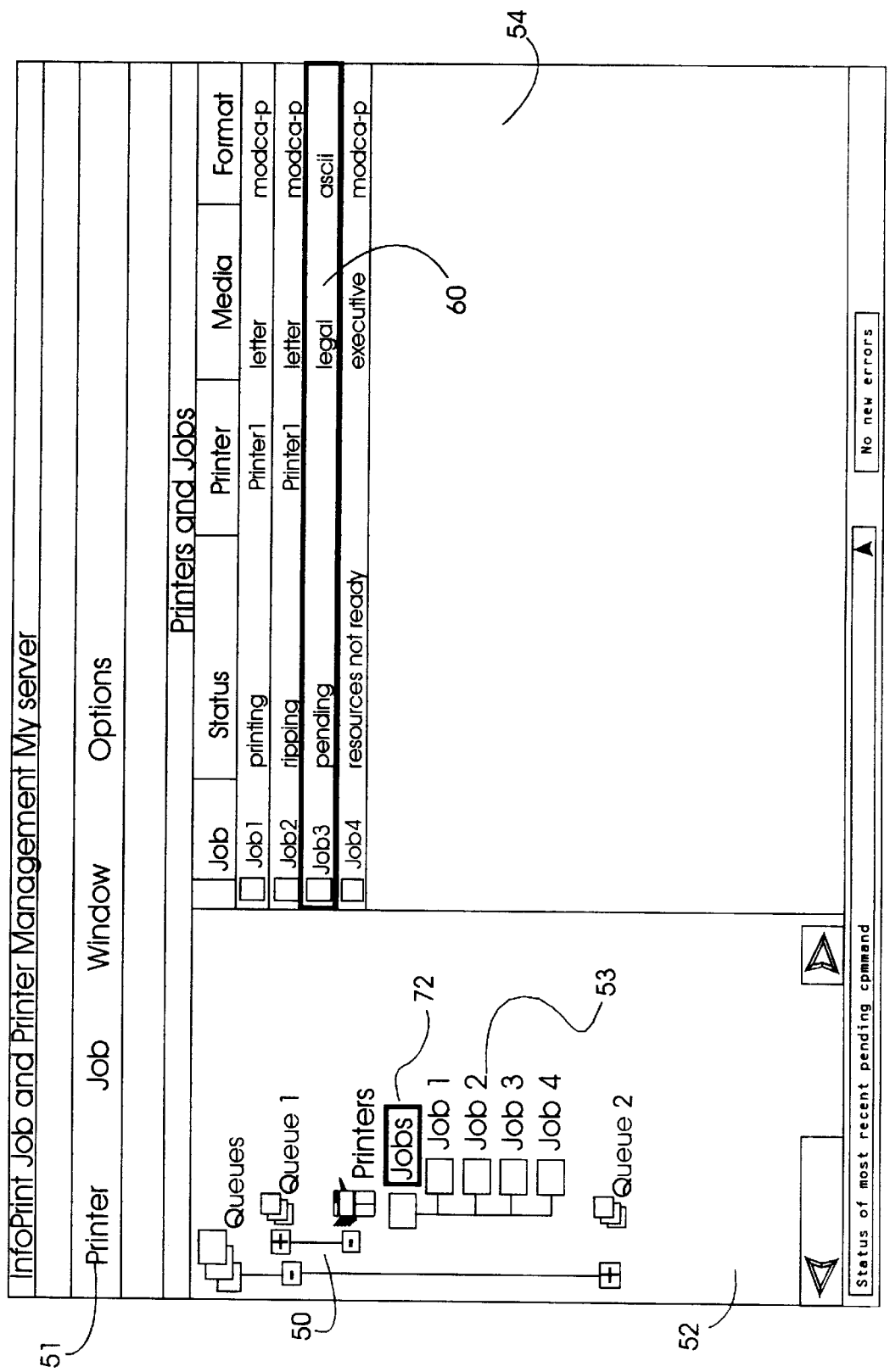
FIG. 6 is the same view of the display screen as FIG. 3 after the modification of the child items of the designated parent item has been completed.

The display screen of FIG. 2 shows a tree 50 of levels in region 52 of a display screen. Also shown is menu bar 51. In the example being described, the tree will pertain to levels of items in to be processed during printer operations. Thus, the items may be awaiting various printing related actions to be applied to them. In FIG. 3, Queue 1 is expanded to show the next lower level, a queue of Printer Jobs 53: Job1 through Job4. In order to make a modification of actions to be applied, Jobs representation 72 has been selected by the operator, which has resulted in an expanded view 70 of all four jobs in the job queue giving details of actions to be carried out. For purposes of this example, let us assume that after reviewing this information, the operator wishes to modify actions applied to all of the documents which are child items under Job3. These child items (documents) are not shown in this screen but may be seen hereinafter, as in FIG. 6A as group 62 of Doc1 through Doc3. Thus, the operator selects Job3, 71 which is shown highlighted in FIG.

3. This commences the operation to modify all of Doc1 through Doc3 as follows. First, the operator selects Job modification 55 from menu bar 51 in FIG. 4. This drops menu 56 from which the operator selects the "Change Media" process. This results in the dialog box 57 of FIG. 5 appearing on which the operator scrolls until the item in scroll window 58 is "legal", which indicates that the action modification is the change in media from letter to legal paper. The operator then confirms the change by pressing the OK button 59. This results in the display screen of FIG. 6 which indicates that in Job3 all of the child documents have had the actions to be applied to them modified so that they will be printed on legal paper. This will be clearer with respect to FIG. 6A which shows the group of child documents: Doc1 through Doc3 with the medium modified in all so that legal paper will be used. The group of child items or documents in FIG. 6A has been brought up by the operator pointing and clicking on Job3 which is shown highlighted 61 to indicate its section for display of the child documents in the queue 62. Thus, the operator, by designating Job3, which represents its child documents, Doc1 through Doc3 for change to legal paper has modified Doc1 through Doc3 to be printed on legal paper. However, Job3 itself has not been modified, it remains unchanged in Queue1.

Figure 7:
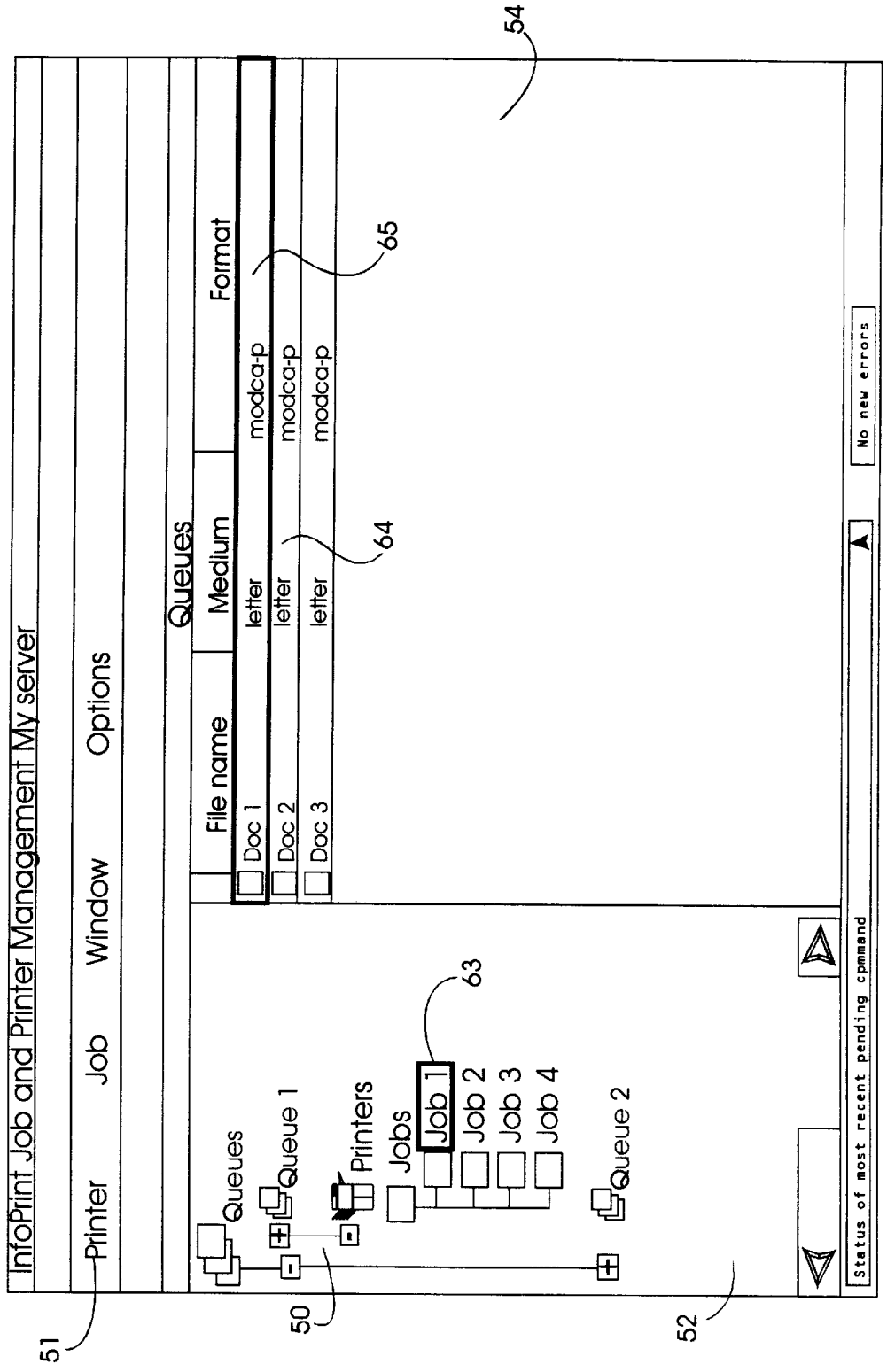
FIG. 7 is the view of the display screen of FIG. 3 after the views on the screen have been expanded to show the child items of a selected parent item from the tree of FIG. 3.
Figure 8:
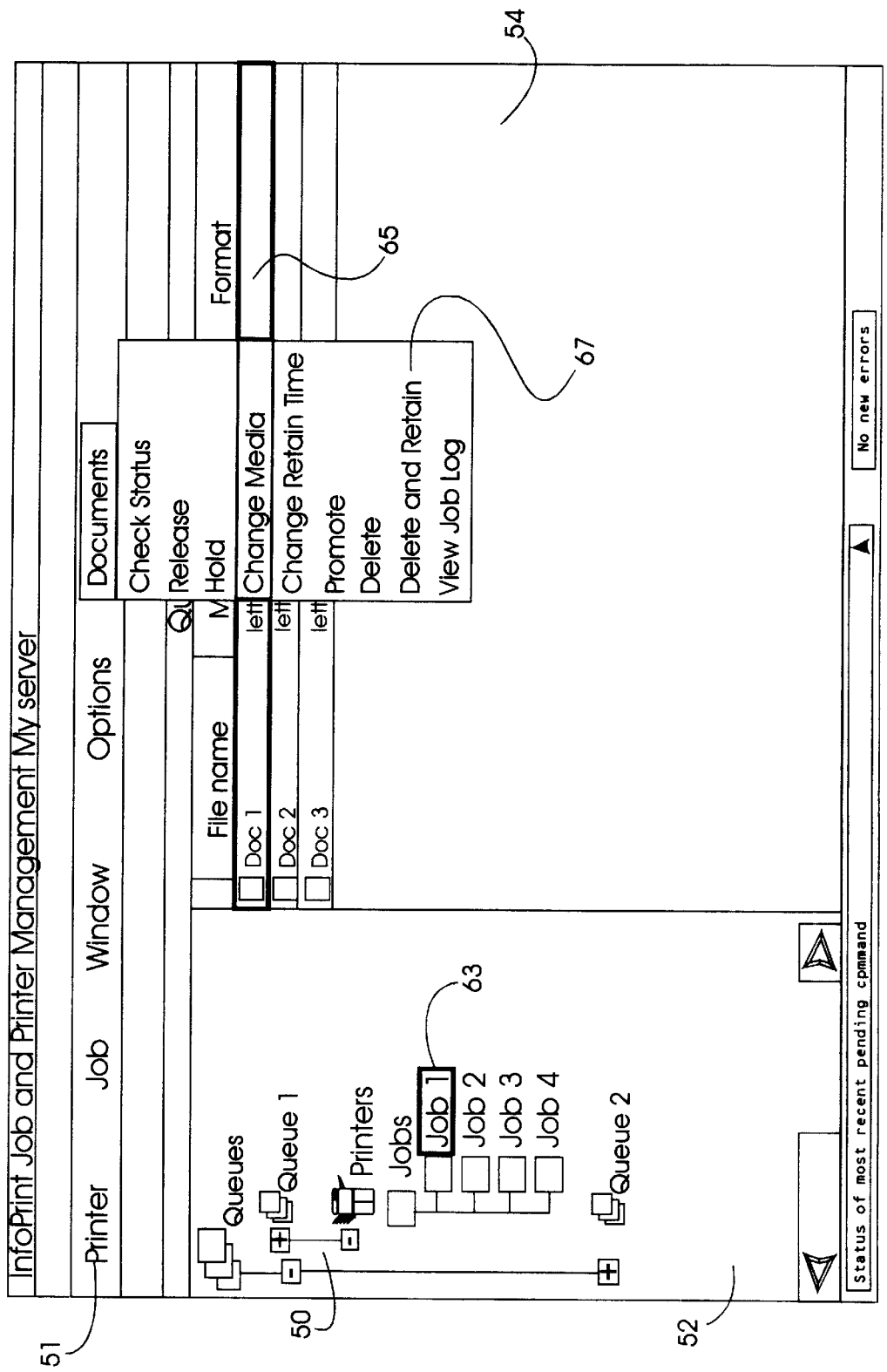
FIG. 8 is the view of the display screen of FIG. 7 during the modification at selected child item level.
Figure 9:
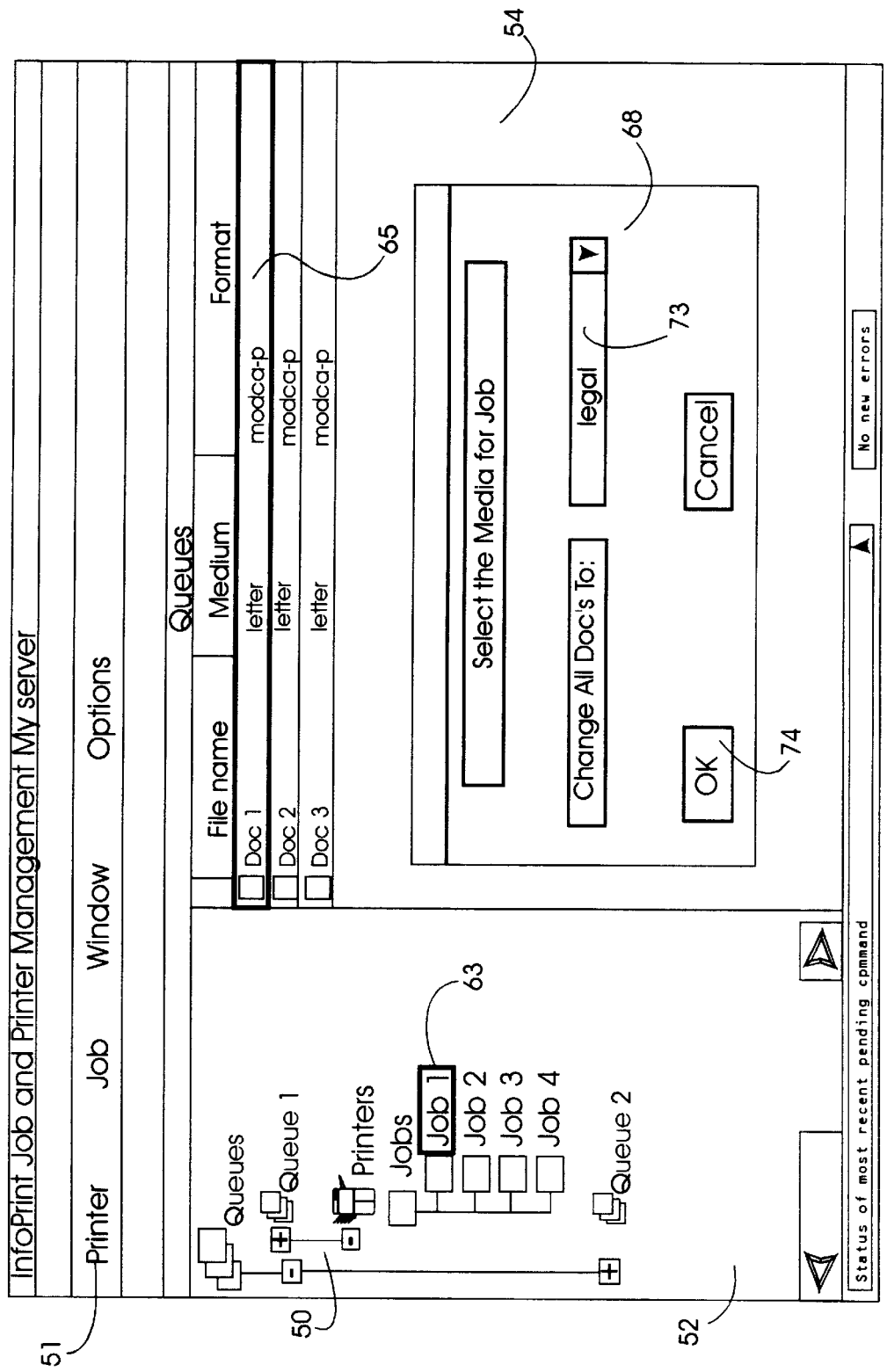
FIG. 9 is the view of the display screen of FIG. 7 during the next step of modification after the step FIG. 8 with respect to said selected child item.
Figure 10:
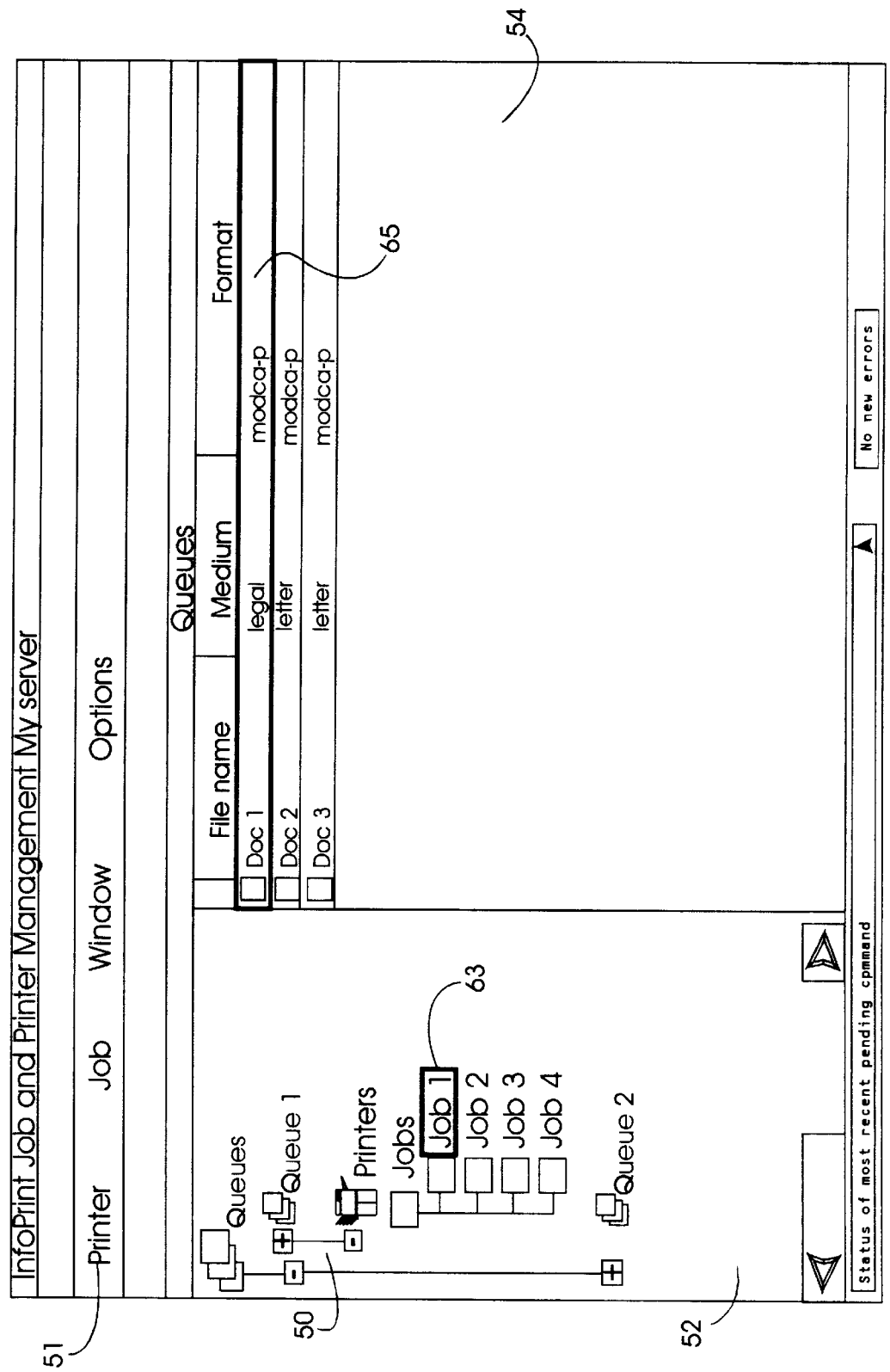
FIG. 10 is the same view of the display screen as FIG. 7 after the modification of the selected child item has been completed.

Now commencing with FIG. 7 there will be described a procedure whereby an individual child item may be modified as to the actions to be applied to it without modifying other child items in the group from its parent. One of the child documents in the group represented by Job1 is to be individually modified. The operator selects Job1 which is shown highlighted 63. This brings up document group 64. Doc1 is selected by the operator and thus highlighted 65 which indicates that it is to be changed. Then, FIG. 8, the "Documents" item 66 is selected from menu bar 51, menu 67 drops down and "Change Media" is selected. This results in the dialog box 68 of FIG. 9 appearing on which the operator scrolls until the item in scroll window 73 is "legal", which indicates that the action modification is the change in media from letter to legal paper for Doc1. The operator then confirms the change by pressing the OK button 74. This results in the display screen of FIG. 10 which indicates that Doc1 has had its paper changed from letter to legal while other child items, Doc2 and Doc3 remain with letter paper.

Figure 11:
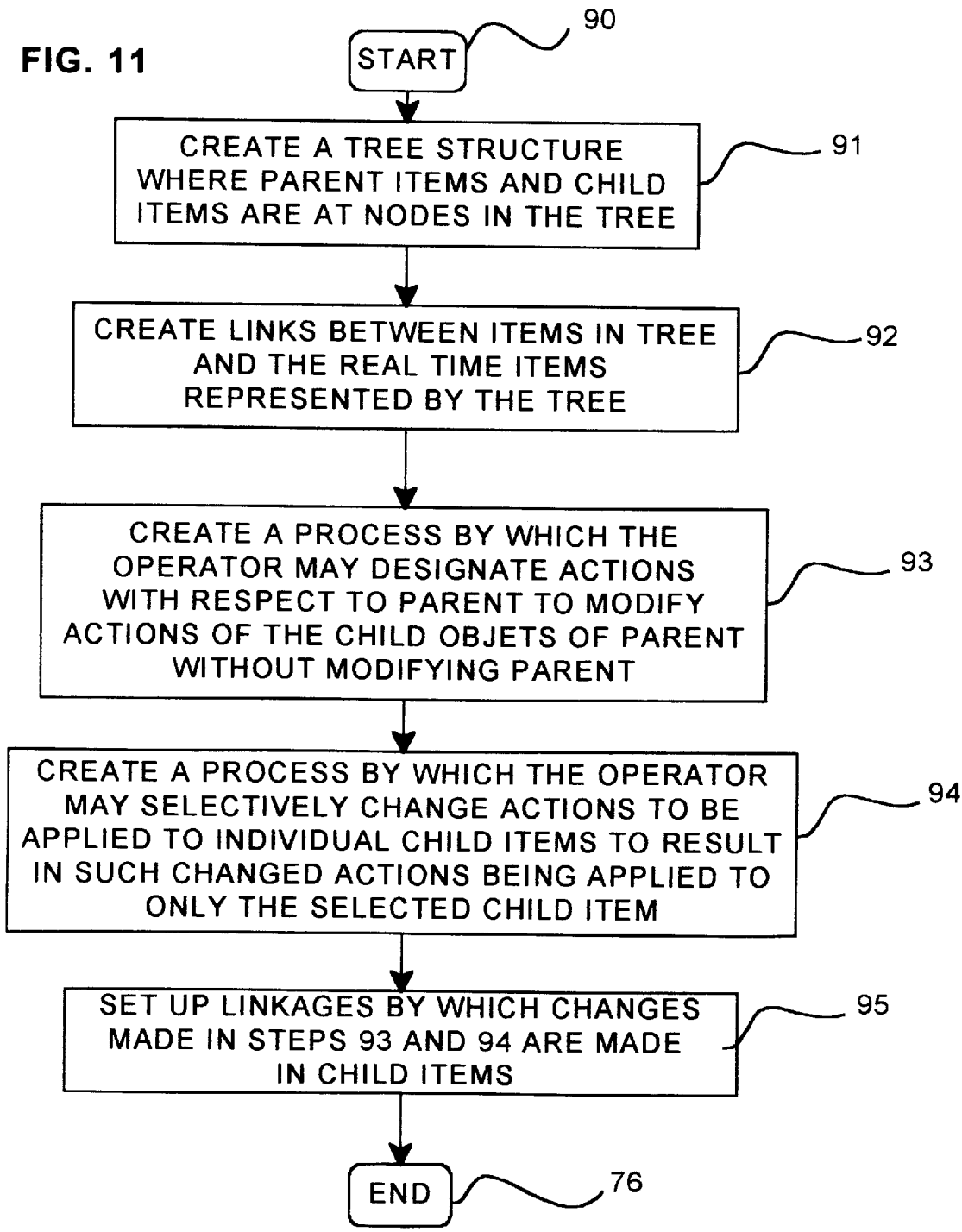
FIG. 11 is a flowchart showing the development of the program of the present invention for designating the child items for modification both at the parent and individual child levels.

Now with reference to FIG. 11 we will describe a process implemented by a program according to the present invention. The started 90 program is continuous and involves the development of the display screen interfaces previously described with respect to FIGS. 2 through 10. In the flowchart of FIG. 11, a basic tree interface is set up, step 91, wherein the items at tree nodes represent items involved in the operations being controlled. In the present example, these would be printer operation control interfaces. Of course, appropriate conventional linkages are set up between the actual real-time items involved in the operations and representations of the items displayed on a screen whether these representations be text or icons, step 92.

Then a process is set up whereby the operator may designate modifications at parent level modifications in the actions to be applied to child items of that parent and to have such modifications applied to all of the child items, step 93, without any corresponding modification to the parent. These are the modifications described with respect to FIGS. 3 through 6A.

Then, step 94, a process is set up by which the operator may elect to change actions applied to only a child item individually. This type of modification has been described with respect to FIGS. 7 through 10. Next, step 95, a set up is made whereby the modifications made by the processes of steps 93 and 94 are reflected in the displayed tree; in this connection, modifications made by the process of step 93 are reflected in FIG. 6A, while modifications made by the process of step 94 are reflected in FIG. 10.

Figure 12:
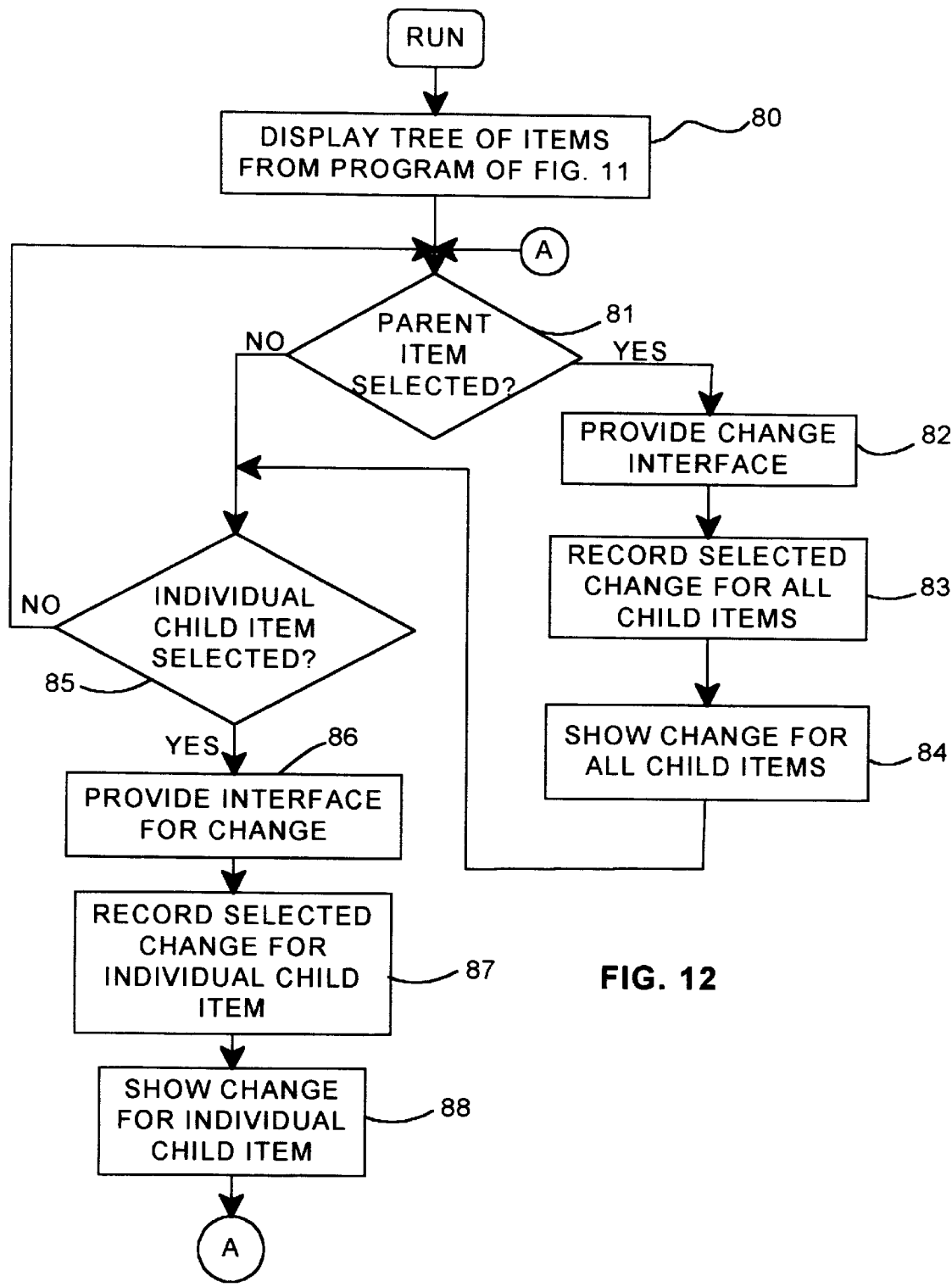
FIG. 12 is a flowchart showing the running of the program described with respect to FIG. 11.

Now that the basic program has been described and illustrated, there will be described, with respect to FIG. 12, a flow of a simple operation showing how the program could be run. First, step 80, the basic trees of items used, FIGS. 2 through 10, and described in steps 91 and 92 of FIG. 11 are set up. Next, step 81, a determination is made as to whether the operator has designated an item at a parent level in order to make an overall action modification in the child items represented by this parent. If Yes, then, step 82, an appropriate set of screen interfaces for this modification are provided, e.g. the interfaces of FIGS. 4 and 5. The modifications are recorded in the system for all of the child items represented by the parent, step 83, and the changes are shown on the display, step 84, e.g. the changes shown in FIGS. 6 and 6A. Then, step 85, a determination is made as to whether the operator has selected a modification to be made in just one of the individual child items represented by a parent, e.g. the individual child item change selected in the screen of FIG. 7. Step 85 also would have been done directly if the decision from step 81 had been No. If the decision from step 85 is Yes, then, step 86, an appropriate set of screen interfaces for this modification are provided, e.g. the interfaces of FIGS. 8 and 9. The modifications are recorded in the system for the individual child item, step 87, and the changes are shown on the display, step 88, e.g. the changes shown in FIG. 10. The process flow then returns to decision step 81 via branch "A", and a further determination is awaited on additional action modifications to be designated by the operator. Step 81 would have been returned to directly if the decision from step 85 had been No.

While the present invention has been described using trees of items in printer operations as the illustrative example, the invention is equally applicable to the management and control of a wide variety of operations including the management of directories/folders and files/documents. For example, the present invention would allow all documents in a folder to be printed by specifying a print operation/action at the folder level. Likewise, all documents could be deleted by specifying, at the folder level, a deletion of all documents without deleting the folder itself. Other properties of the documents (e.g. format, font, etc.) could also be changed at the folder/directory level. The invention is equally applicable to the management of industrial, chemical, and manufacturing production operations including the manufacturing of integrated circuits, as well as automated tool and die production. The use trees of action items could be a very significant implement in all such operations. In addition, queues of items are very extensively used in all aspects of communications including the distribution of programs, documents and information packets of all varieties over the Internet, and the present invention could be of value in modifying items in such communications operations.

Although certain preferred embodiments have been shown and described, it will be understood that many changes and modifications may be made therein without departing from the scope and intent of the appended claims. For example, although the invention has been described with reference to modification of properties, the invention is also applicable to actions to be taken on child items which could be designated at the parent level. Such actions may involve the printing, deleting, etc. of documents, for example.

What is claimed is:

1. A data processor controlled user interactive display interface for controlling operations comprising:

a displayed tree of items, wherein a parent item at one level has a plurality of child items at the next lower level, means for enabling a modification of at least one property of each of said child items by enabling a designation of the modification at the parent item without modifying a property of the parent item; and means for enabling a second modification of properties of at least one of said plurality of child items independently of any designation of modification made at the parent item.

2. The display interface of claim 1 wherein at least one of said child items has further child items at the next further lower level.

3. The display interface of claim 1 wherein said operations are production operations.

4. The display interface of claim 3 wherein said production operations are printing operations.

5. A method for interactively interfacing with a data processor controlled display for controlling operations comprising:

providing a displayed tree of items, wherein a parent item at one level has a plurality of child items at the next lower level, enabling a modification of at least one property of each of the child items by enabling a designation of the modification at the parent item without modifying a property of the parent item; and enabling a second modification of properties of at least one of said plurality of child items independently of any designation of modifications made at the parent item.

6. The method of claim 5 wherein at least one of said child items has further child items at the next further lower level.

7. The method of claim 5 including the further step of interactively designating the modification at the parent item to thereby modify the property of each of the child items without modifying a property of the parent item.

8. The method of claim 7 wherein said operations are production operations.

9. The method of claim 8 wherein said production operations are printing operations.

10. A computer controlled display program having program code included on a computer readable medium for an user interactive interface to a computer controlled display comprising:

means for enabling a displayed tree of items, wherein a parent item at one level has a plurality of child items at the next lower level, means for enabling a modification of at least one property of each of said child items by enabling a designation of the modification at the parent item without modifying a property of the parent item; and means for enabling a second modification of properties of at least one of said plurality of child items independently of any designation of modification made at the parent item.

11. The computer controlled display program of claim 10 wherein at least one of said child items has further child items at the next further lower level.

12. The computer controlled display program of claim 10 wherein said operations are production operations.

13. The computer controlled display program of claim 12 wherein said production operations are printing operations.

* * * * *

UNITED STATES PATENT AND TRADEMARK OFFICE
CERTIFICATE OF CORRECTION

PATENT NO. : 6,115,044
DATED : September 5, 2000
INVENTOR(S) : Alimpich et al.

Page 1 of 1

It is certified that error appears in the above-identified patent and that said Letters Patent is hereby corrected as shown below:

<u>Title page,</u>
Item [75], please correct the inventor "Philip" to -- Phillip --

Signed and Sealed this

Twenty-sixth Day of March, 2002

*Attest:*

*Attesting Officer*

JAMES E. ROGAN
*Director of the United States Patent and Trademark Office*